Figure 1:
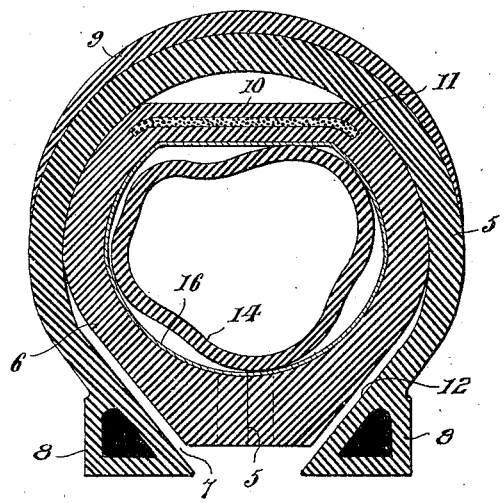

H. S. BLYNT.
PNEUMATIC VEHICLE TIRE.
APPLICATION FILED JAN. 15, 1921.

1,438,015.

Patented Dec. 5, 1922.

Inventor
H. S. Blynt
By J. K. Bryant,
Attorney

Patented Dec. 5, 1922.

1,438,015

UNITED STATES PATENT OFFICE.

HERBERT S. BLYNT, OF YALE, OKLAHOMA.

PNEUMATIC VEHICLE TIRE.

Application filed January 15, 1921. Serial No. 437,554.

*To all whom it may concern:*

Be it known that I, HERBERT S. BLYNT, a citizen of the United States of America, residing at Yale, in the county of Payne and State of Oklahoma, have invented certain new and useful Improvements in Pneumatic Vehicle Tires, of which the following is a specification.

This invention relates to certain new and useful improvements in pneumatic vehicle tires and the primary object of the invention is to provide a device for insertion within the ordinary tire shoe which may, of itself, act as an improved inner tube or, which may serve as a tube receiver and protector in such manner as to eliminate many of the great difficulties and troubles had with tires and tubes as they are used at present.

As at present used, the inner tube, under pressure, is not round in cross section, but is forced out of shape by being expanded or stretched laterally and inwardly to fit the differently shaped space within the tire shoe and thereby fill a vacancy at the inner part of said shoe. When a tire is on the rim, there is a somewhat wedge-shaped space between the tube and the shoe into which a flap is generally inserted to prevent the tube from coming in contact with the adjacent part of the metal rim. The flap above mentioned is seldom used after the garage man once changes the tube. As a result of this, thousands of tires are ruined by allowing the tube to come in contact with the metal portion of the rim, said rim being repeatedly heated in warm weather particularly, or by fast driving, and the friction produced by the expansion and contraction of the tube causes it to burst and tear.

The space at the inner part of the tire shoe is filled by a portion of the device constituting the present invention and I thereby provide a perfectly round space in cross section so that when a tube is used inside of the protector, such tube will not be strained or stretched out of shape.

Another advantage of the invention is that the present tube or tube receiver and protector can be made quicker than the ordinary tube. In making the ordinary tube, the materials to be used are first calendered into sheets, cut into proper widths and rolled on mandrels. These sheets are then wrapped with cloth under pressure by a special machine and vulcanized or cured. When they are cured, they are taken out and the tube is removed from the mandrel by forcing air under pressure between the tube and the mandrel. The tube is then pulled off, and in doing so, the tube is forced inside out and is thereby considerably strained. Next, the tubes are cut into lengths and the ends of the same are ground down or skived. They are then treated to a bath of acid and joined together and then revulcanized after which the pad for the valve is applied. The tubes practically go through this same process and the valve is inserted. The present invention does away with this when the usual tube is not employed, as the present invention may be manufactured in one operation. In other words, the invention is formed of the material or goods after the latter leave the rubber mill and they are cut into one strip, put on a core, and placed into the mold. They are then cured and come out finished in one operation of a few simple successive steps.

Another great advantage in the present invention is that repairs can be done thereon by access to the inside of the same, while the usual tubes have to be repaired from the outside. All that is required to repair the present invention is to open it, and in case of a rent or tear, it can be repaired with a fabric or rubber patch while only a rubber patch can be used on the usual tube.

With the above general objects in view and others that will become apparent as the nature of the invention is better understood, the same consists in the novel form, combination and arrangement of parts hereinafter more fully described in connection with the accompanying drawings and in which like reference characters designate corrsponding parts throughout the several views.

Figure 2:
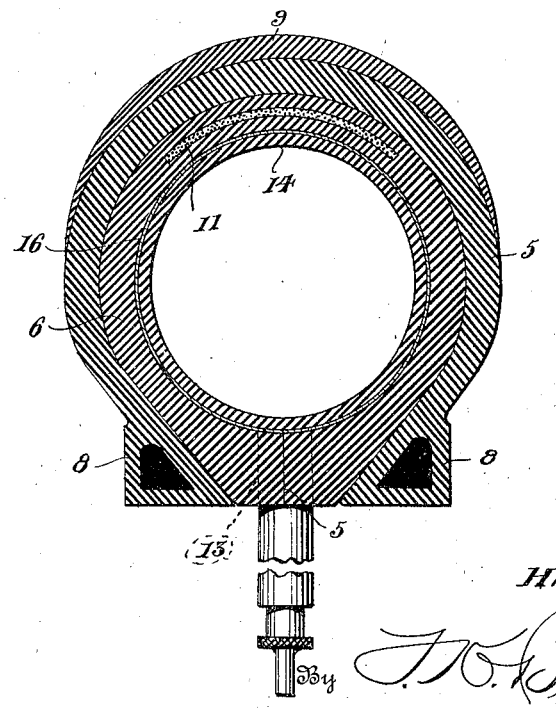

In the drawings,

Figure 1 is a theoretical cross sectional view of a tire equipped with the present invention before inflation, and Figure 2 is a similar view after inflation.

The protector of the present invention is made in what is known as a full mold and comprises a hollow annulus split circumferentially at its inner side as indicated at 5, so that the annulus is not air tight or practically an air container until after it is inflated as will presently become apparent.

This protector is indicated broadly by the numeral 6 and is made of suitable somewhat elastic material molded to the shape of Figure 1 wherein the inner portion of the same is normally spaced as at 7 from the bead portions 8 of the tire shoe 9 when said bead portions are in their proper spaced relation wherein they are confined by the usual tire rim. The tread portion of the protector is also molded to have a normally flat form as at 10 so that when the device is inflated, this flat portion is stretched and forced outwardly to snugly engage the inner face of the tire shoe 9 as shown in Figure 2 but with a tendency to return to its flat position should a tack or the like pass through the tread portion of the tire shoe and press upon said flat portion 10. Puncturing of the tread portion of the protector is thus avoided, and said tread portion may be and preferably is provided as at 11 with the usual internal member known as a breaker strip and employed to take any unusual shock upon the tube should the tire strike a stone or rough place in the road by causing the tire to rebound and thereby reducing the chances of stone bruising to a minimum.

The inclined inner faces 12 of the shoe 9 serve to cause the meeting faces of the protector 6 at the point 5 to be tightly forced in contact with each other when the protector is expanded as shown in Figure 2, thereby insuring a tight joint which will not leak as at 5. It is to be understood that the device is so made that there is sufficient and proper material at and around the slit 5 to insure sufficient compression at this point for the purpose of obtaining the desired leak-proof joint, and as shown by dotted lines at 13, the protector is formed with an opening of slightly smaller diameter than the usual stem of an inflating valve which is employed, so that when the protector is expanded as in Figure 2, the walls of said opening 13 are forced into tight contact with said valve stem to insure against leakage at this point. The invention may or may not be employed with the usual inner tube 14, but if such tube is employed a circular space for the same is provided within the protector 6 so that stretching of this tube out of shape as hereinbefore mentioned is prevented and at the same time, the tube is protected against penetration by sharp bodies such as tacks or the like.

It will be noted that the greater the pressure on the inside of the protector, the tighter the inner portion of the same will be wedged for providing an air tight joint at the slit 5. Another function which the present invention performs is to strengthen or re-enforce the the side portions 15 of the tire shoe 9 where considerable wear and tear usually takes place from various causes when in use. If desired, the top portion 10 may be molded in any depressed form such as concave, but the same is preferably flat as shown when normal. It is also noted that the protector 6 may be lined with a fine fabric as at 16 for strengthening purposes and this fabric is preferably formed by cutting on the bias and building the same in as a permanent part of the protector.

There are numerous advantages to the present invention and among the same are the facts that the same does away with the flap hereinbefore mentioned and the usual inner tube may also be dispensed with although the latter can be used in combination with this protector. Further, the present protector when used with a tube insures perfectly round shape in cross section to the latter when inflated for eliminating the usual strains, and if the tube is dispensed with many operations used in the manufacture of the latter are avoided. Still further, the protector may be made complete in one general tire making operation known as the full mold process, and so far as is known, no air containing tube for tires has been practical under this process.

From the foregoing description, it is believed that the construction and operation as well as the advantages of the present invention will be readily understood and appreciated by those skilled in the art.

Minor changes may be made without departing from the spirit and scope of the invention as hereinafter claimed.

What is claimed as new is:

1. As an article of manufacture, an endless elastic inner tube for pneumatic tires circumferentially split at its inner portion, the inner portion of the tube being relatively thicker than the remaining portion thereof and of wedge-shape, said wedge-shaped inner portion being wider than the space at the inner portion of the tire shoe with which the tube is to be used whereby the meeting edges of the tube at the split of the inner portion of the latter are forced together when the tube is inflated.

2. As an article of manufacture, an endless inner tube for pneumatic tires circumferentially split at its inner portion, the inner portion of the tube being relatively thicker than the remaining portion thereof and of wedge-shape, said wedge-shaped inner portion being wider than the space at the inner portion of the tire shoe with which the tube is to be used whereby the meeting edges of the tube at the split of the inner portion of the latter are forced together when the tube is inflated, said tube being elastic and flexible and molded to have its entire tread portion normally assume an inwardly depressed condition so as to lie in spaced relation to the inner face of the tread portion of the tire shoe.

3. As an article of manufacture, an endless inner tube for pneumatic tires circumferentially split at its inner portion, the inner portion of the tube being relatively thicker than the remaining portion thereof and of wedge-shape, said wedge-shaped inner portion being wider than the space at the inner portion of the tire shoe with which the tube is to be used whereby the meeting edges of the tube at the split of the inner portion of the latter are forced together when the tube is inflated, said tube being elastic and flexible and molded to have its entire tread portion normally assume an inwardly depressed condition so as to lie in spaced relation to the inner face of the tread portion of the tire shoe, and with the side and inner portions of the tube slightly spaced from the adjacent portions of the usual tire rim and tire shoe.

4. As an article of manufacture, an endless inner tube for pneumatic tires circumferentially split at its inner portion, the inner portion of the tube being relatively thicker than the remaining portion thereof and of wedge-shape, said inner portion of the tube being also of normally greater width than the space between the beads of the shoe in which the tube is to be used and being formed adjacent said split of compressible material whereby the meeting edges of the tube at the inner portion of the latter are forced together when the tube is inflated for providing an air-tight joint at said split.

In testimony whereof I affix my signature.

HERBERT S. BLYNT.